United States Patent
Franzen et al.

(10) Patent No.: US 6,224,797 B1
(45) Date of Patent: May 1, 2001

(54) METHOD FOR PRODUCING REACTIVE PLASTIC MOLDED BODIES WITH HIGHLY FILLED COARSE-GRAINED FILLING MATERIAL

(75) Inventors: Reinhold Franzen, Leverkusen (DE); Anthony Martinus Jacobus van Staveren, Lopik (NL); Géza Avar, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/331,225
(22) PCT Filed: Dec. 11, 1997
(86) PCT No.: PCT/EP97/06927
   § 371 Date: Jun. 17, 1999
   § 102(e) Date: Jun. 17, 1999
(87) PCT Pub. No.: WO98/28125
   PCT Pub. Date: Jul. 2, 1998

(30) Foreign Application Priority Data

Dec. 23, 1996 (DE) ............................................... 196 54 075

(51) Int. Cl.[7] ............................. B29C 39/02; B29C 44/02
(52) U.S. Cl. ........................................... 264/45.3; 264/319
(58) Field of Search ................................. 264/45.3, 109, 264/128, 319

(56) References Cited

U.S. PATENT DOCUMENTS

| | | | |
|---|---|---|---|
| 3,281,515 | * 10/1966 | Schmitz | 264/236 |
| 4,504,283 | * 3/1985 | Charvat | 51/298 |
| 4,588,420 | * 5/1986 | Charvat | 51/298 |
| 4,624,818 | * 11/1986 | Black et al. | 264/113 |
| 4,698,010 | 10/1987 | Toncelli | 425/200 |
| 4,784,814 | 11/1988 | Diethelm et al. | 264/102 |
| 5,328,648 | 7/1994 | McBrien et al. | 264/35 |
| 5,328,656 | 7/1994 | Thulin | 264/571 |
| 5,409,654 | 4/1995 | Platusich | 264/161 |
| 5,503,544 | 4/1996 | Platusich | 425/116 |
| 5,509,441 | 4/1996 | Platusich | 137/375 |
| 5,834,527 | * 11/1998 | Sulzbach | 264/50 |

OTHER PUBLICATIONS

Patent Abstract of Japan, vol. 18, No. 037, Jan. 20, 1994 & JP 05–269799, (Nippon Plast. Co. Ltd), Oct. 19, 1993.
Becker/Braun, Kunststoff–Handbuch, vol. 7, "Polyurehthanes", pp. 177 to 179 (Undated).

* cited by examiner

Primary Examiner—Allan R. Kuhns
(74) Attorney, Agent, or Firm—Joseph C. Gil; N. Denise Brown

(57) ABSTRACT

The invention describes a method for producing reactive plastics molded bodies with a high proportion of coarse-grained filler, in which the coarse-grained filler is heated to an elevated temperature before being fed into the mold.

8 Claims, 2 Drawing Sheets

METHOD FOR PRODUCING REACTIVE PLASTIC MOLDED BODIES WITH HIGHLY FILLED COARSE-GRAINED FILLING MATERIAL

The invention relates to a method for producing moulded bodies from a matrix of a reactive plastics material, in particular polyurethane, with coarse-grained filler, such as gravel, quarry material, slag, comminuted rubble, foam concrete, plastics waste or similar, enclosed therein.

A proposal which has already been made for the production of synthetic stone blocks lies in mixing pieces of stone with an organic binder in a mixing device under vacuum and then, following compaction, pressing them into blocks in a vacuum mould through vibration (DE-A 35 22 910). Reactive plastics materials, in particular those with a high reaction rate, cannot be used as binders in a method of this kind, as the reaction would start while mixing the binder with the pieces of stone.

WO 91/18725 has proposed firstly feeding the filler into the mould and introducing the reactive mixture into the closed mould by means of hoses, which are withdrawn from the mould as the cavities remaining in the latter are filled. According to U.S. Pat. No. 5,328,648, bonding elements for concrete-encased steel pipes are produced by this method. In this case the steel pipes have non-encased ends which are welded together. The weld is then surrounded by a sleeve into which the feed hoses for the binder and gravel used as the filler are inserted. A reactive polyurethane mixture is subsequently fed in through the hoses, which are removed from the sleeve as the cavities between the filler are filled with reactive mixture. One disadvantage of this method lies in the fact that the feed hoses for the reactive mixture which are to be removed leave cavities which cause the binder to be inhomogeneously distributed, at least in the area where the hoses were originally located. Another disadvantage lies in the fact that the age of the binder in the moulded body is distributed over the geometry of the latter. When using quick-reacting reactive plastics materials, the part of the moulded body which is firstly filled with binder will already have solidified when the last part of the mould is filled with binder. This causes inhomogeneous forces within the moulded body which may lead to burning or even fracture. In order to counter this, U.S. Pat. No. 5,328,648 proposes extending the binder by substantial quantities of plasticizer, such as organic carbonates.

It has now been found that moulded bodies based on quick-reacting reactive plastics materials and having a high proportion of coarse-grained filler can easily be produced if the filler is at a temperature of 60 to 80° C., which accelerates the setting of the binder, while the latter is being fed into the mould.

The present invention accordingly provides a method for producing reactive plastics moulded bodies with a high proportion of coarse-grained filler which is characterised in that the filler is heated to a temperature of 60 to 80° C., the filler is then fed into the mould and possibly compacted, and the reactive plastics mixture is then introduced into the mould. The reactive plastics mixture is preferably introduced from the bottom of the mould. It is particularly preferable for the reactive plastics mixture to be produced in a countercurrent high-pressure mixing chamber just before being introduced into the mould. The temperature of the reactive plastics mixture may lie between 10 and 30° C., in particular at ambient temperature.

Moulded bodies which are substantially stress-free are obtained according to the invention. This is due to the fact that the reactive plastics mixture sets very quickly at the surface of the filler, which is at a higher temperature, yet the intermediate volume between the filler particles remains fluid and is further distributed by the direct pressure of the binder in the mould, where it reacts out at other filler surfaces. According to the invention this in the first place results in a uniform age distribution of the reactive plastics mixture due to the surfaces of the filler particles being covered by the binder which is fed in first and the interstices being occupied by the binder which is fed in last. Secondly, the moulded body always sets from the surfaces of the filler particles inwards towards the interstices. The moulded body can as a result adapt stress-free to the mould until it has completely set.

The reactive plastics mixture which is used is preferably a reactive polyurethane mixture. Generally suitable constituents of the reactive polyurethane mixture are disclosed in, for example, DE-A 1 694 138. The isocyanates used are preferably those based on diphenylmethane diisocyanate. Preferred polyols are polyether polyols. The mixture may also comprise expanding agents in quantities such that the resulting density of the set polyurethane is between 200 and 1,200 kg/m$^3$, preferably 400 to 800 kg/m$^3$. It is preferable to use water in quantities of 0.5 to 3 wt. %, related to the mixture, as the expanding agent.

The mixture is preferably produced in an injection mixing head, the outlet of which delivers directly into the mould. Mixing heads of this kind are basically known in polyurethane technology (see Becker/Braun, Kunststoff-Handbuch (Plastics Handbook), Vol. 7: Polyurethanes, 1993, p. 177 ff.) Depending on the complexity of the moulding to be produced, it may be necessary to provide a plurality of mixing heads simultaneously delivering into the mould in order to distribute the reactive mixture uniformly over the mould volume.

The advantages of the moulded bodies according to the invention with respect to concrete or conventional polymer concrete are higher productivity, due to rapid setting of the reactive polyurethane mixture, improved resistance of the moulded bodies to chemicals and abrasion, improved toughness and reduced weight.

Moulded bodies according to the invention may be produced as soundproof walls, sewers, gutters, shaft linings, dewatering systems, machine frames, bearing elements, feeding troughs or even grease separators. Because the reactive polyurethane mixture adheres particularly well to concrete, the method according to the invention is also highly suitable for bonding concrete elements in the building construction field or when laying concrete pipes. In this case the elements to be bonded are surrounded by sleeves which form the mould cavity.

DETAILED DESCRIPTION OF THE INVENTION

The invention is illustrated in detail in the following on the basis of the accompanying figures.

Figure 1:
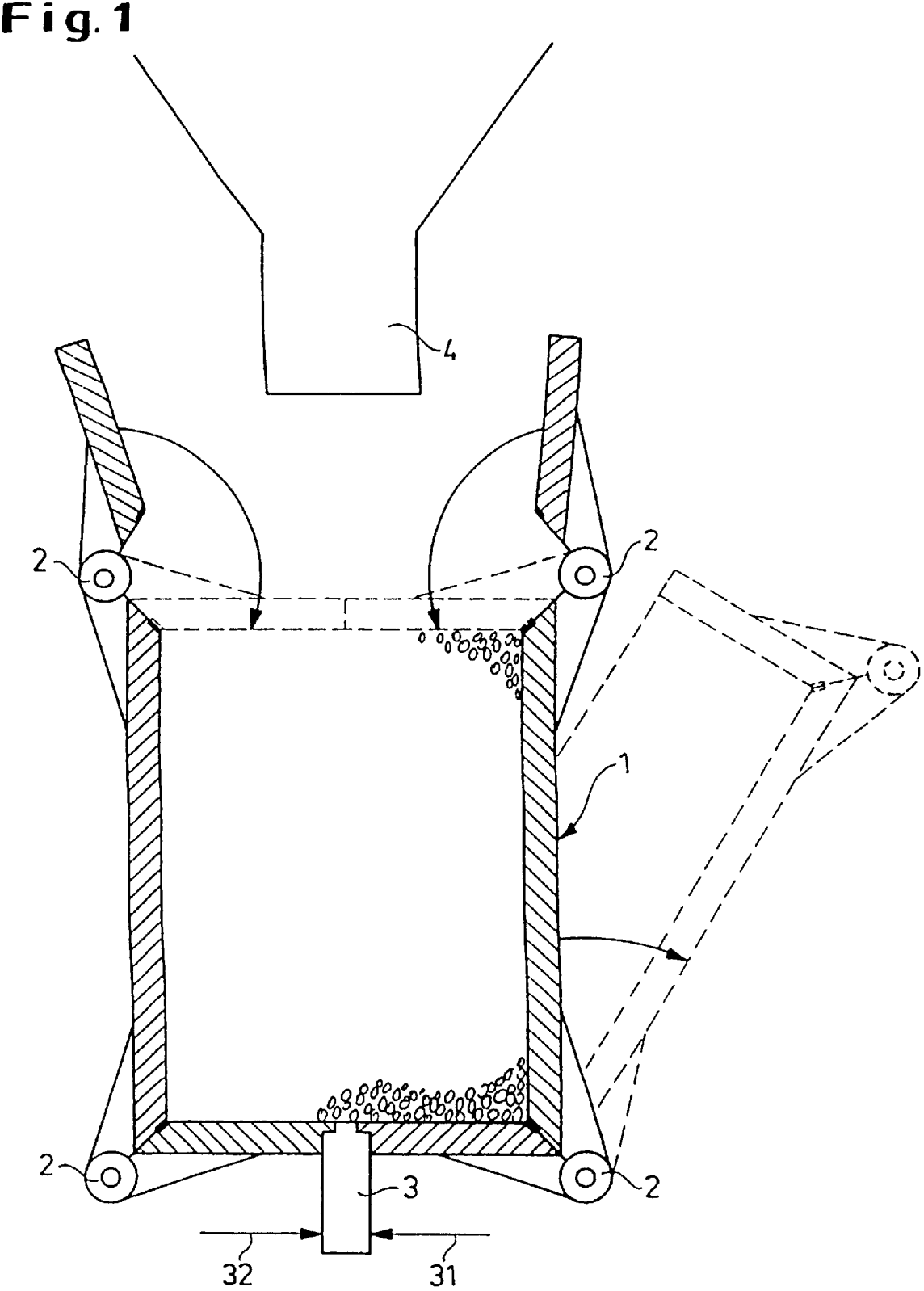
FIG. 1 illustrates a mould apparatus used for forming a moulded body according to the invention.

FIG. 1 basically illustrates the production of a moulded body according to the invention. The mould 1 preferably consists of mould wall elements which can be opened by means of hinges 2. An injection mixing head 3 (possibly a plurality thereof) is preferably disposed in the bottom area of the mould, to which head the components of the reactive mixture are delivered, as indicated by arrows 31 and 32. The coarse-grained filler, preferably having a grain size of 5 to 25 mm, which is preheated to the required temperature, is fed into the mould via a funnel 4. The mould is then closed and the reactive mixture injected. Within a few minutes, possibly even fractions of minutes, the moulding can be removed from the mould.

Figure 2:
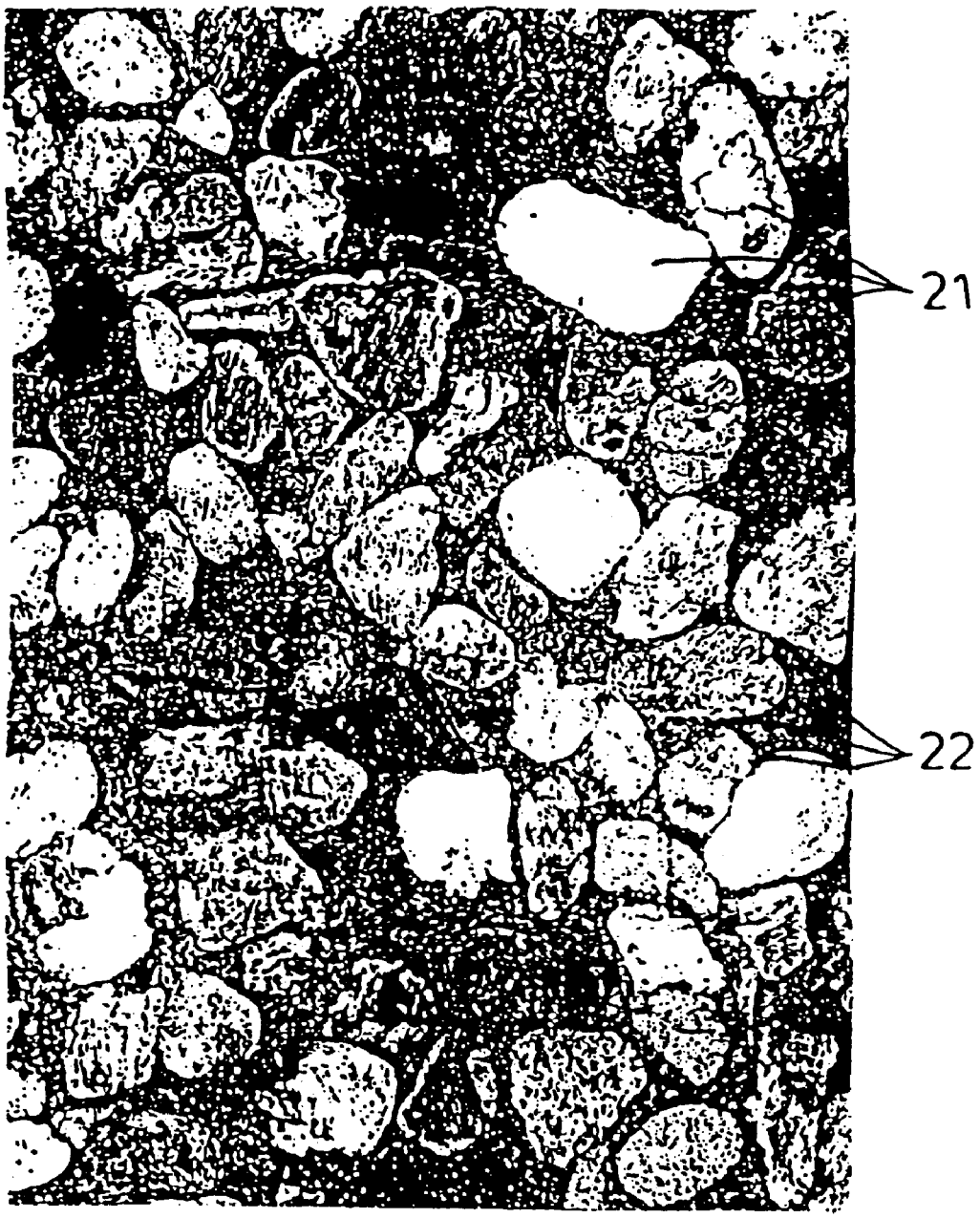
FIG. 2 shows a micrograph of a sectional moulded body according to the invention.

FIG. 2 shows the micrograph of a sectional moulded body according to the invention which consists of a tight packing of pebbles 21 and a polyurethane foam matrix 22 of a density of 650 kg/m$^3$.

What is claimed is:

1. A method for producing reactive plastics molded bodies with a high proportion of coarse-grained filler, comprising
   1) heating the filler to a temperature of 60 to 80° C.,
   2) feeding the heated filler into a mold,
   3) optionally, compacting the filler,
   4) closing the mold,
   5) introducing a reactive plastics mixture into the mold after steps 1), 2) and 4) optionally 3), are completed,
   6) allowing the materials inside the mold to cure, and
   7) removing the resultant molded body from the mold.

2. The method of claim 1, wherein the reactive plastics mixture comprises a polyurethane-forming reactive mixture.

3. The method of claim 1, wherein the reactive plastics mixture is produced in a countercurrent high-pressure mixing chamber just prior to being introduced into the mold.

4. The method of claim 1, wherein the reactive plastics mixture is heated to a temperature of between 10 and 30° C.

5. The method of claim 1, wherein the reactive plastics material comprises a foaming agent in an amount such that the density of the set reactive plastics material is between 200 and 1,200 kg/m$^3$.

6. The method of claim 1, wherein the coarse-grained filler has a grain size of 5 to 25 mm.

7. The method of claim 1, wherein the coarse-grained filler is selected from the group consisting of gravel, comminuted quarry material, slag, rubble, foam concrete, and plastics waste.

8. The method of claim 1, wherein reinforcement elements selected from the group consisting of steel, glass fiber strands, and glass fiber cloth are also introduced into the mold.

* * * * *

UNITED STATES PATENT AND TRADEMARK OFFICE
CERTIFICATE OF CORRECTION

PATENT NO.    : 6,224,797 B1
DATED         : May 1, 2001
INVENTOR(S)   : Reinhold Franzen et al.

It is certified that error appears in the above-identified patent and that said Letters Patent is hereby corrected as shown below:

Delete the text at Column 2, Line 51, through Column 2, Line 59, and insert this text at Column 1, Line 66.

<u>Column 3,</u>
Line 22, replace "steps 1), 2 and 4) optionally" with -- steps 1), 2 and 4 optionally --.

Signed and Sealed this

Sixth Day of April, 2004

JON W. DUDAS
*Acting Director of the United States Patent and Trademark Office*